United States Patent [19]

Kovach

[11] 4,293,317
[45] Oct. 6, 1981

[54] FISSION PRODUCT ADSORBENT IMPREGNATED WITH QUINUCLIDENE

[76] Inventor: Julius L. Kovach, 2948 Brookdown Dr., Worthington, Ohio 43085

[21] Appl. No.: 112,934

[22] Filed: Jan. 17, 1980

[51] Int. Cl.$^3$ ............................................. B01D 53/02
[52] U.S. Cl. ........................................... 55/71; 55/74; 252/438
[58] Field of Search ..................... 55/71, 74, 387, 388; 252/438, 444

[56] References Cited

U.S. PATENT DOCUMENTS

| | | | |
|---|---|---|---|
| 2,818,323 | 12/1957 | Haensel | 55/71 X |
| 2,963,441 | 12/1960 | Dolian et al. | 252/190 |
| 3,453,807 | 7/1969 | Taylor | 55/71 |
| 3,539,653 | 11/1970 | Frevel et al. | 260/681.5 |
| 4,016,242 | 4/1977 | Deitz | 55/71 X |
| 4,040,802 | 8/1977 | Deitz | 55/71 |

*Primary Examiner*—John Adee
*Attorney, Agent, or Firm*—Mueller and Smith

[57] ABSTRACT

Disclosed is a method for removing an alkyl halide from gas stream contaminated therewith which comprises contacting said gas stream with a particulate adsorbent impregnated with quinuclidene. The alkyl halide usually is an alkyl iodide comprising methyl iodide, optionally radioactive, and the preferred particulate adsorbent is activated carbon.

17 Claims, No Drawings

FISSION PRODUCT ADSORBENT IMPREGNATED WITH QUINUCLIDENE

BACKGROUND OF THE INVENTION

The present invention relates to impregnated adsorbents suitable for removing organic halide fission products in isotope processing nuclear reactors and other nuclear installations, and more particularly to a much improved impregnant therefor.

One of the nuclear fission products which results from irradiated nuclear fuel is iodine. Upon contact with atmospheric organic impurities, the iodine tends to form alkyl halides and particularly methyl iodide. It is known that adsorbents such as activated carbon can be impregnated with specific amine compounds which permit a complete steric fit of the alkyl halide concomitent with their retention on the adsorbent. Consequently, conventional methods for trapping radioactive methyl iodide ($CH_3{}^{131}I$) use activated carbons impregnated with iodine salts and/or containing secondary and tertiary amines particularly consisting of morpholine, piperidine, piperazine, or triethylene diamine (U.S. Pat. No. 3,453,807) or with alkanol amines which contain an alkylene group of 2-6 carbon atoms (U.S. Pat. No. 3,539,653).

While such reaction between secondary and tertiary amines and halides is well known and even the use of these amines for impregnating carbon is known, the selection of such amines for forming fission product adsorbents primarily has been by trial and error; thus, optimum adsorbent impregnant combinations have not been found.

The present invention will set forth specific criteria which have been developed in order to properly evaluate the efficacy of impregnant candidates. Also, an amine which meets all of the specified criteria will be disclosed.

BROAD STATEMENT OF THE INVENTION

One aspect of the present invention is a method for removing an alkyl halide, usually an alkyl iodide comprising methyl iodide, from a gas stream contaminated therewith. Such method comprises contacting said gas stream with a particulate adsorbent impregnated with quinuclidene.

Another aspect of the present invention is a particulate adsorbent effective for selectively removing substantially all of an alkyl halide from a gas stream contaminated therewith. Such particulate adsorbent comprises particulate adsorbent in finely-divided form which is impregnated with quinuclidene.

A further aspect of the present invention is a method for making an impregnated particulate adsorbent which is effective for removing an alkyl halide from a gas stream contaminated therewith. Such method comprises contacting said adsorbent with an aqueous quinuclidene impregnant to impregnate said adsorbent with between about 0.1% and about 5% by weight of said quinuclidene.

Advantages of the present invention include the fact that the quinuclidene impregnated adsorbent is highly efficient in removing alkyl halide from a gas stream contaminated therewith. Another advantage is that virtually all of the alkyl halide is removed from the gas stream even with very short contact times between the gas stream and impregnated adsorbent. Another advantage of the present invention is that the resulting adsorbent-alkyl halide complex is very stable. A further advantage of the present invention is that the quinuclidene and the quinuclidenealkyl halide complex are retained on the solid adsorbent well. These and other advantages will be readily apparent from the disclosure of the present invention contained herein.

DETAILED DESCRIPTION OF THE INVENTION

As noted above, work on the present invention resulted in a set of criteria for use in properly evaluating candidate impregnants. By assessing each candidate impregnant against the criteria developed, selection of optimum adsorbent-impregnant combinations can now be made. The criteria developed are set forth below.

1. The impregnant should react with organic halides (organic iodides and primarily methyl iodide) rapidly even at low temperature;
2. The resulting halide-amine complex should be stable;
3. The reaction should be virtually complete and require only a small quantity of the impregnant;
4. The impregnant and the resulting halide-amine complex should be well retained (adsorbed) on the adsorbent surface; and
5. The adsorbent should be able to adsorb the impregnant from water.

In order to satisfy the foregoing criteria, it is important that the amine impregnant should not act as a stericly hindered amine, otherwise the conflicting steric requirements of the groups attached to the reacting amine and halide components would induce a strained condition in the complex and attendant loss of stability thereof. Also, such conflicting steric requirements undesirably drastically affect both the reaction rate and the activation energy of the reaction.

Further, the foregoing criteria emphasize the importance for the amine to be well adsorbed on the adsorbent. When the adsorbent is activated carbon, the typical requirement for this criterion is that the amine contains specific groups which permit its adsorption by the activated carbon. For example, conventional morpholine and triethanol amine impregnants are not adsorbed onto activated carbon from water, thus such impregnants do not meet the required criteria. Other conventional impregnants contain alkyl groups adjacent to the electron pair of the nitrogen atom which project in such a manner as to hinder the approach along this path of any halide group of high steric requirements. Again, such impregnants do not meet the foregoing criteria.

Further, fast reaction rates between the amine and the halide are required in order to minimize the pressure drop across the adsorbent bed. Also, because systems containing the adsorbent must be available using only emergency power supplies (especially at nuclear facilities), the energy requirement for equal removal efficiency in shallower beds is significantly less. Consequently, at commercial nuclear power plant and fuel processing installations, only shallow beds of the impregnated adsorbent can be tolerated.

One amine which satisifies all of the foregoing specified criteria and which forms the basis for the present invention is quinuclidene (1-azabicyclo[2.2.2]octane). The reaction rate constant even at 25° C. is approximately 2.0 between quinuclidene and methyl iodide. Moreover, under conventional iodide-adsorbent conditions of about 25°–150° C., the reaction rate between quinuclidene and methyl iodide is so fast that accurate measurement thereof becomes difficult. Even for higher alkyl iodides such as ethyl iodide and propyl iodide, the reaction rate, while somewhat slower, still is sufficient for obtaining the required removal efficiency using shallow beds of the quinuclidene impregnated adsorbent.

Quinuclidene contains an amine group at one end of the molecule while the opposite end of the molecule permits its ready adsorption and retention on the preferred adsorbent activated carbon. The structural formula for quinuclidene is given below.

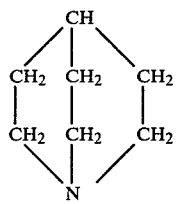

Although other adsorbents may find use in the present invention, activated carbon is distinctly preferred, especially for practical commercial use of the present invention. Nominal particle size of the adsorbent ranges from about 0.2 to 4.0 millimeters and is typically formed into beds of about 2.5 to 20 centimeters in thickness.

Impregnation of activated carbon or other adsorbent with the quinuclidene can be accomplished by a variety of techniques. One technique involves immersing the adsorbent in an aqueous solution of quinuclidene. Alternatively, the quinuclidene or an aqueous solution of thereof can be sprayed onto the adsorbent. Another technique involves saturating a hot air stream with quinuclidene and contacting the adsorbent therewith, for example, by passing such saturated stream through a bed of the adsorbent. Regardless of the technique employed for impregnating the adsorbent, only a very small quantity of quinuclidene is required to impregnate the adsorbent for achieving the required removal efficiency. For example, under standard evaluation conditions specified in ASTM D3803, the following efficiencies have been obtained experimentally at 30° C. and 95% relative humidity (Test Method A).

0.5% Quinuclidene 99.39%
1.0% Quinuclidene 99.78%
2.0% Quinuclidene 99.99%

Clearly, the foregoing test results illustrate the removal efficiency of quinuclidene impregnated adsorbents even at relatively low temperature. Moreover, the stability of the halide-quinuclidene complex formed is remarkable. The stability of the quinuclidene impregnant-halide complex was proven by determining the efficiency of the impregnated adsorbent after 6 months of aging.

2.0% Quinuclidene 99.89%

Certainly the efficiency of the quinuclidene impregnant at very low use levels also is demonstrated by the foregoing tests. Generally, the proportion of quinuclidene should be from between about 0.1% and about 5% by weight of the adsorbent and preferably from between about 0.5% and about 2% by weight is used. Also, contact times ranging from about 0.1 to about 2.0 seconds can be tolerated by a bed of the impregnated adsorbent while still retaining the excellent efficiencies thereof.

I claim:

1. A method for removing an alkyl halide from a gas stream contaminated therewith comprising contacting said gas stream with a particulate adsorbent impregnated with quinuclidene.

2. The method of claim 1 wherein said alkyl halide is an alkyl iodide.

3. The method of claim 2 wherein said alkyl halide is radioactive.

4. The method of claim 2 or 3 wherein said alkyl iodide is a $C_1$-$C_6$ alkyl iodide.

5. The method of claim 4 wherein said alkyl iodide comprises methyl iodide.

6. The method of claim 1 wherein said particulate adsorbent is activated carbon.

7. The method of claim 6 wherein said particulate adsorbent ranges in particle size from about 0.2 to about 4 millimeters.

8. The method of claim 1 or 6 wherein said particulated adsorbent is provided as a bed thereof.

9. The method of claim 1 or 6 wherein said particulate adsorbent is impregnated with between about 0.1% and 5% by weight of said quinuclidene.

10. The method of claim 4 wherein said particulate adsorbent is activated carbon impregnated with between about 0.1% and 5% by weight of said quinuclidene.

11. A particulate adsorbent effective for selectively removing substantially all of an alkyl halide from a gas stream contaminated therewith which comprises particulate adsorbent in finely-divided form which is impregnated with quinuclidene.

12. The adsorbent of claim 11 wherein said adsorbent is activated carbon.

13. The adsorbent of claim 11 or 12 wherein said adsorbent ranges in particle size from about 0.2 to about 4 millimeters.

14. The adsorbent of claim 11 or 12 wherein said adsorbent is impregnted with between about 0.1% and 5% by weight of said quinuclidene.

15. The adsorbent of claim 14 wherein said alkyl halide comprises methyl iodide which optionally may be radioactive.

16. A bed of the adsorbent of claim 11 or 12.

17. A bed of the adsorbent of claim 14.

* * * * *